(12) United States Patent
Son

(10) Patent No.: US 7,070,744 B2
(45) Date of Patent: Jul. 4, 2006

(54) PURIFICATION SYSTEM OF EXHAUST GASES OF AN INTERNAL COMBUSTION ENGINE

(75) Inventor: Geon Seog Son, Yongin-shi (KR)

(73) Assignee: Institute for Advanced Engineering, Seoul (KR)

( * ) Notice: Subject to any disclaimer, the term of this patent is extended or adjusted under 35 U.S.C. 154(b) by 579 days.

(21) Appl. No.: 09/863,376

(22) Filed: May 24, 2001

(65) Prior Publication Data

US 2001/0043890 A1 Nov. 22, 2001

(30) Foreign Application Priority Data

| May 20, 1999 | (KR) | ................ 1999-18202 |
| Jun. 9, 1999 | (KR) | ................ 1999-10163 |
| Sep. 2, 1999 | (KR) | ................ 1999-37176 |
| Oct. 2, 1999 | (KR) | ................ 1999-42456 |
| Oct. 14, 1999 | (KR) | ................ 1999-44464 |

(51) Int. Cl.
*B01J 19/08* (2006.01)
*F01N 3/10* (2006.01)

(52) U.S. Cl. ............................ 422/186.04; 6/275
(58) Field of Classification Search ................ 422/172, 422/174, 177, 180, 186.04, 186.3; 60/275
See application file for complete search history.

(56) References Cited

U.S. PATENT DOCUMENTS

| 5,672,324 A | * | 9/1997 | Okamoto et al. | ............ 422/174 |
| 5,778,664 A | * | 7/1998 | Janata et al. | ................... 60/274 |
| 5,861,611 A | * | 1/1999 | Kato et al. | ................... 219/552 |
| 5,942,195 A | * | 8/1999 | Lecea et al. | ................. 422/174 |
| 6,040,064 A | * | 3/2000 | Bruck et al. | ................. 428/593 |
| 6,047,543 A | * | 4/2000 | Caren et al. | ................... 60/275 |

FOREIGN PATENT DOCUMENTS

| JP | 4-76924 | 7/1992 |
| JP | 5-340239 | 12/1993 |
| JP | 6-15143 | 1/1994 |
| JP | 6-319953 | 11/1994 |
| JP | 7-133717 | 5/1995 |
| JP | 8-266854 | 10/1996 |
| JP | 9-287435 | 11/1997 |
| JP | 10-266831 | 10/1998 |
| WO | 9748476 | 12/1997 |
| WO | 9912638 | 3/1999 |
| WO | WO 99/12638 A1 * | 3/1999 |

* cited by examiner

Primary Examiner—Kevin P. Kerns
(74) Attorney, Agent, or Firm—Jacobson Holman PLLC

(57) ABSTRACT

A purification system of exhaust gases in an internal combustion engine purifies the exhaust gases by disposing a reaction furnace in an exhaust pipe of the internal combustion engine. The system includes a reactor including a honeycomb carrier having a plurality of carrier cells in the reaction furnace and plasma generating electrodes. On each of the plurality of carrier cells, a photocatalyst layer is coated. Further, the plasma generating electrodes, having a plurality of electrode cells, are mounted at an inner end and an outer end of the honeycomb carrier.

23 Claims, 14 Drawing Sheets

PURIFICATION SYSTEM OF EXHAUST GASES OF AN INTERNAL COMBUSTION ENGINE

FIELD OF THE INVENTION

The present invention relates to a purification system of exhaust gases; and, more particularly, to a purification system of exhaust gases of an internal combustion engine for vehicles for using precious metals as a high temperature active catalyst, e.g., a 3-way catalytic converter, and for using a photocatalyst coated on a honeycomb as a low temperature catalyst, in which both reactions of an oxidation and a reduction are simultaneously accomplished in high and low temperatures by using a low temperature plasma as a photic source to thereby purify pollutants contained in the exhaust gases and power consumption and strength of the plasma photic source are maintained depending upon an installing position of electrodes.

BACKGROUND OF THE INVENTION

Generally, an internal combustion engine is a heat engine for reciprocating a piston by explosively burning a fuel mixed with air in cylinders. Exhaust gases generated in burning are exhausted externally through an exhaust apparatus 10, as shown in FIG. 1, comprising an exhaust manifold 12 collecting the exhaust gases in each of the cylinders, an exhaust pipe 14 for exhausting them into the exterior, a muffler 16 for reducing an exhaust noise, and a catalytic converter 18 for oxidizing and reducing noxious components in the exhaust gases to thereby make them harmless. However, since harmless components such as unburned hydrocarbon, carbon monoxide, nitrogen oxide, sulfur oxide, etc. are contained in the exhaust gases, the exhaust gases exhausted from the cylinders should be collected, purified at a purification system disposed at a middle of the exhaust pipe 14, and then exhausted to the exterior.

A purifier using 3-way catalyst, low temperature plasma, a combination of the 3-way catalyst and the low temperature plasma, and a photocatalyst, etc is used as a purification system.

The purification system for using the 3-way catalyst utilizes precious metals capable of catalyzing, that is, platinum(Pt)+rhodium(Rh) or platinum+rhodium+palladium (Pd), to thereby simultaneously reduce carbon monoxide, hydrocarbon, nitrogen oxide in the exhaust gases and, in high temperature, to have an excellent purification effect of 98% or more.(see SAE982606). Therefore, in recent, the purification for using the 3-way catalyst is frequently used.

However, in the case of purifying the exhaust gases by using the 3-way catalyst, it has a shortcoming in that heat is needed to activate the catalyst as well as the catalysis thereof is performed only at a predetermined temperature. That is, before the catalyst is activated at the predetermined temperature, such as an initial stage of starting an engine for vehicles, noxious components are not smoothly removed. In other words, when the catalyst has not reached a specific active temperature, the exhaust gases are exhausted in air just as the hydrocarbon that is not purified.

Further, in order to perform both reactions of oxidation and a reduction, since it must be close to a theoretic mixture ratio, it has a shortcoming in that an exhaust condition is restricted. Accordingly, when only the mixture ratio is close to the theoretic mixture ratio the noxious components such as unburned hydrocarbon, carbon monoxide, and nitrogen oxide, etc. are reduced. In other words, when a fuel is rich, the purification to hydrocarbon and carbon monoxide is suddenly reduced, while when air in the fuel is rich, the purification to nitrogen oxide is suddenly reduced.

Recently, it has been studied in various fields in order to improve a fuel rate and to reduce a deflection of carbon dioxide for reducing a green house effect.

For example, techniques regarding a lean burn engine or a gasoline direct injection engine(GDI) have been proposed, but since a large amount of oxygen exists in the exhaust gases, it is a shortcoming in that a 3-way catalyst cannot be used.

That is, in case of the lean burn engine or the gasoline direct injection engine, since the engines are driven at a rich supply of air, an oxygen of 10% and more and a large amount of nitrogen oxide exists in the exhaust gases depending upon a lean burn combustion condition. Thus, it is a restriction that the large amount of nitrogen oxide cannot be sufficiently purified by only the 3-way catalyst.

Specifically, in case of a diesel engine, it is a problem that a particulate material is generated using a low grade fuel, a large amount of nitrogen oxide is produced by the lean burn and the purification capability of the exhaust gases is remarkably deteriorated by oxygen.

In order to overcome these problems, a nitrogen oxide reducing system and a nitrogen oxide absorbing system using low temperature plasma are recently used. These purification systems are mainly used as a fixed internal combustion engine or a desulphurization or denitration system of a large engine to thereby purify nitrogen dioxide in the exhaust gases by using a reducing agent such as urea or ammonia, etc. into nitrogen and oxygen.

These low temperature plasma purification systems comprise electrodes in an induction tube in which exhaust gases flow, the electrodes being supplied with a power supply such as the direct current (DC) or an alternate current (AC) in order to generate the plasma. When the exhaust gases pass through the induction tube, moisture, oxygen or nitrogen and the like existing in the exhaust gases are ionized or dissociated by the low temperature plasma to thereby generate a free radical, thereby purifying contaminants. (See SAE982428)

However, since these low temperature plasma purification systems need a high energy and a supplying apparatus and since a reactor is relatively bulky relative to an amount of exhaust gases, a matter to be purified is limited to nitrogen oxide and sulfur oxide. That is, even though these systems are suitable to a fixed internal combustion engine for reducing hydrocarbon and nitrogen oxide of a low concentration of about 1000 ppm, it is a shortcoming in that enormous energy corresponding to 2% of an internal combustion engine output is consumed in order to activate the plasma as well as a volume of the respective systems is increased 10 times or more. Further, since the systems are bulky in a large installation space, it is unsuitable to be used with general automotive vehicles requiring a moving activity and restricting a useful energy.

In order to reduce noxious components in the initial stage of starting at cold temperature, energy is supplied from a power supply of a condenser, not from a generator. Thus, since energy capacity is small in an energy system of the existing vehicles, the purification of the exhaust gases cannot be performed, while when energy capacity is increased, it should be concomitant with subsidiary facilities, causing a cost as well as an installation problem. Further, in order to reduce relatively high unburned hydrocarbon components of about 6000 ppmC in the exhaust gases, a plasma reactor having significant large volumes and a predetermined space needs to install the plasma reactor in vehicles, but, since the installation space of vehicles is limited as is generally known, it is unrealistic to install a high volumetric plasma reactor in vehicles.

Furthermore, an additive such as urea and unburned hydrocarbon needs to convert nitrogen oxide under an oxidation atmosphere. The additive is easily supplied in a fixed type internal combustion engine, but in case of vehicles, it is a problem that an additive supplying system is additionally mounted in the vehicles and it is difficult to secure an installation space of the supplying system in the vehicles and it is hard for drivers to get to continuously supply the additive at a regular interval such as at a time of a fuel filling.

Recently, a system of combined low temperature plasma purification system with the 3-way catalyst purification system has been investigated. That is, the 3-way catalyst purification system is disposed to a backward portion of a plasma reactor to thereby purify unburned hydrocarbon untreated by plasma reaction (See SAE982427, 982429, 982508).

However, since the combination system consumes high energy for generating the plasma and the volume thereof is bulky, it is not preferable to use in a moving type internal combustion engine.

On the other hand, a purification system using a photocatalyst irradiates a photic source having a specific wavelength to the photocatalyst, for example $TiO_2$, and then purifies contaminants by a free radical generated in exciting the photocatalyst. Further, the photocatalyst takes part in a purification reaction of nitrogen oxide as well as an oxidation reaction of carbon monoxide and hydrocarbon, thereby performing an activation without regard to energy or temperature condition (J. of Photochemistry and Photobiology AL Chemistry 111, pp199–203, 1997).

The purification system may use a wavelength contained in a natural light as a photic source, but the photic source needs a specific wavelength in order to active the photocatalyst, thererby increasing an effect. For example, Japanese Laid-open patent Nos. 1994-10652 and 1998-169431 disclose an exhaust gas purification system using a corona discharge and a 3-way catalyst and using an integrally formed plasma generating system with a NOx catalyst system, respectively. As disclosed in these patents, these systems need use of an ultraviolet lamp generating a wavelength of 200–400 nm, but the ultraviolet lamp can convert only 20% of an input energy to an optical energy and convert the remaining energy thereof to a heat energy, resulting in that an energy effect is extremely low, the lifecycle thereof is short and the maintenance cost is high.

On the other hand, it has been proposed a purification method capable of purifying contaminants already exhausted in air by an oxidation method using a bio-filter, an active carbon and an ultraviolet.

The purification method using a bio-filter can biochemically dissolve an organic or non-organic atmospheric contaminant, the method comprising of the steps: placing biochemical active materials to a carrier such as a soil and forcibly circulating air in the carrier, while that using an active carbon comprising of the steps: storing contaminants in carbon for a short time and treating the stored contaminants in a lump. Further, the purification method using an ultraviolet can oxide hydrocarbon by using a sterilization due to an ozone generated when an ultraviolet is irradiated and a radical of oxygen ion and hydrogen ion generated by dissolving water and, for example, the purification method is disclosed to Japanese Laid-open patent Nos. 1999-091345, 1998-244129 and 1998-192654.

However, the above patents employing the above described purification method are a fixed type purification system which is designed to be fixed in place to have a specific amount. Accordingly, although the patents may be useful for purifying an indoor air of a large sized building, e.g., a limited amount of air, they are still inadequate to freely stick to a purification amount because of extra installation expense and an operating cost are required therefore.

SUMMARY OF THE INVENTION

It is, therefore, an object of the present invention to provide a purification system of exhaust gases of an internal combustion engine for vehicles for using precious metals as a high temperature active catalyst, e.g., a 3-way catalytic converter, and for using a photocatalyst coated on a honeycomb as a low temperature catalyst, in which both reactions of an oxidation and a reduction are simultaneously accomplished in high and low temperatures by using a low temperature plasma as a photic source to thereby purify pollutants contained in the exhaust gas and a power consumption and a generating strength of a plasma photic source dependent upon an installing position of electrodes.

It is another object of the present invention to provide an atmospheric purification system for purifying the atmosphere during driving of vehicles and an operation of an air-conditioner thereof regardless of a settled purification amount by coating a photocatalyst on a heat exchanger and irradiating light thereto because an internal combustion engine of the vehicles is cooled by the atmosphere in moving, e.g., an air-cooled type, and a condenser of the air-conditioner is exposed to the atmosphere.

It is a still another object of the present invention to provide a deodorizing and atmospheric purification system for purifying pollutants and a bad smell in air by generating a plasma after coating a photocatalyst and a precious metal catalyst on a carrier and irradiating photon from a photic source.

The above and other objects of the present invention are accomplished by providing a purification system of exhaust gases in an internal combustion engine for purifying the exhaust gases by disposing a reaction furnace capable of reducing noxious components of the exhaust gases in an exhaust pipe of the internal combustion engine, the system comprising:

A reactor including a honeycomb carrier having a plurality of carrier cells, each of which a photocatalyst layer is coated on, in the reaction furnace, and a plasma generating means having a plurality of electrode cells and mounted on an inner end and an outer end of the honeycomb carrier.

In accordance with a preferred embodiment of the present invention, the honeycomb carrier includes a 3-way catalyst layer coated on a wall surface of each of the carrier cells and a photocatalyst layer coated on the 3-way catalyst layer, the photocatalyst layer being activated by a plasma photic source. Further, a volume and a number of each of the electrode cells are varied depending upon the variation of each of the carrier cells, the carrier cells having 100–900 numbers per the united area (1 inch×1 inch).

Furthermore, each of the electrode cells of the plasma generating means is electrodes including a wire mesh formed by intersecting and arranging wires, the electrodes having a regular length in horizontal direction, a cross section of each of the electrodes being in the form of a honeycomb, a wire mesh roll, or a punched plate, and is closely or distantly disposed to each of the honeycomb carriers, and edges of each of the electrode cells are arranged to be positioned at center of each of the carrier cells. The purification system further includes a plurality of reactors in the reaction furnace.

In accordance with another embodiment of the present invention, the purification system further comprises an oxygen supplying portion for supplying oxygen into an exhaust pipe disposed to the purification system ahead.

In accordance with a still another embodiment of the present invention, an atmospheric purification system comprising a photocatalyst coated on a heat exchanger of automotive vehicles; and a photic source, wherein an atmosphere including pollutants passes through the heat exchanger to cause it to be purified by the photocatalyst excited thereby, wherein the heat exchanger includes a radiator with an internal circulating fluid of an internal combustion engine of the automotive vehicles therein and having a plurality of cooling pins for a heat exchanging, and the heat exchanger includes a condenser having a plurality of cooling pins operating as part of an air-conditioner of the automotive vehicles, the photocatalyst being coated on the plurality of cooling pins.

FIG. 1 shows a schematic view showing a purification system of a typical internal combustion engine;

FIG. 2 sets forth a cross sectional view showing a purification system of an internal combustion engine in accordance with a first embodiment of the present invention, wherein a reactor employs a wire mesh as an electrode therein;

FIG. 3 displays a front sectional view, taken along A—A line in FIG. 2;

FIG. 4 provides a cross sectional view showing a modification embodiment of FIG. 2, wherein a reactor employs a honeycomb electrode as an electrode therein;

FIG. 5 offers a front sectional view, taken along B—B line in FIG. 4;

Figure 9:
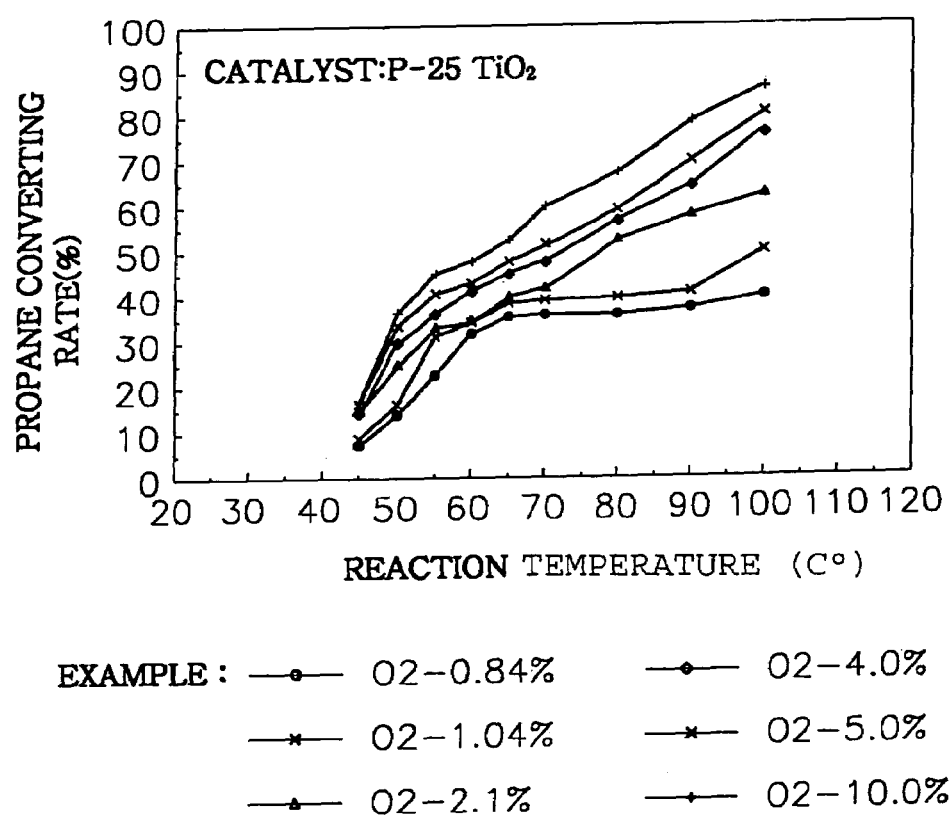
Figure 10:
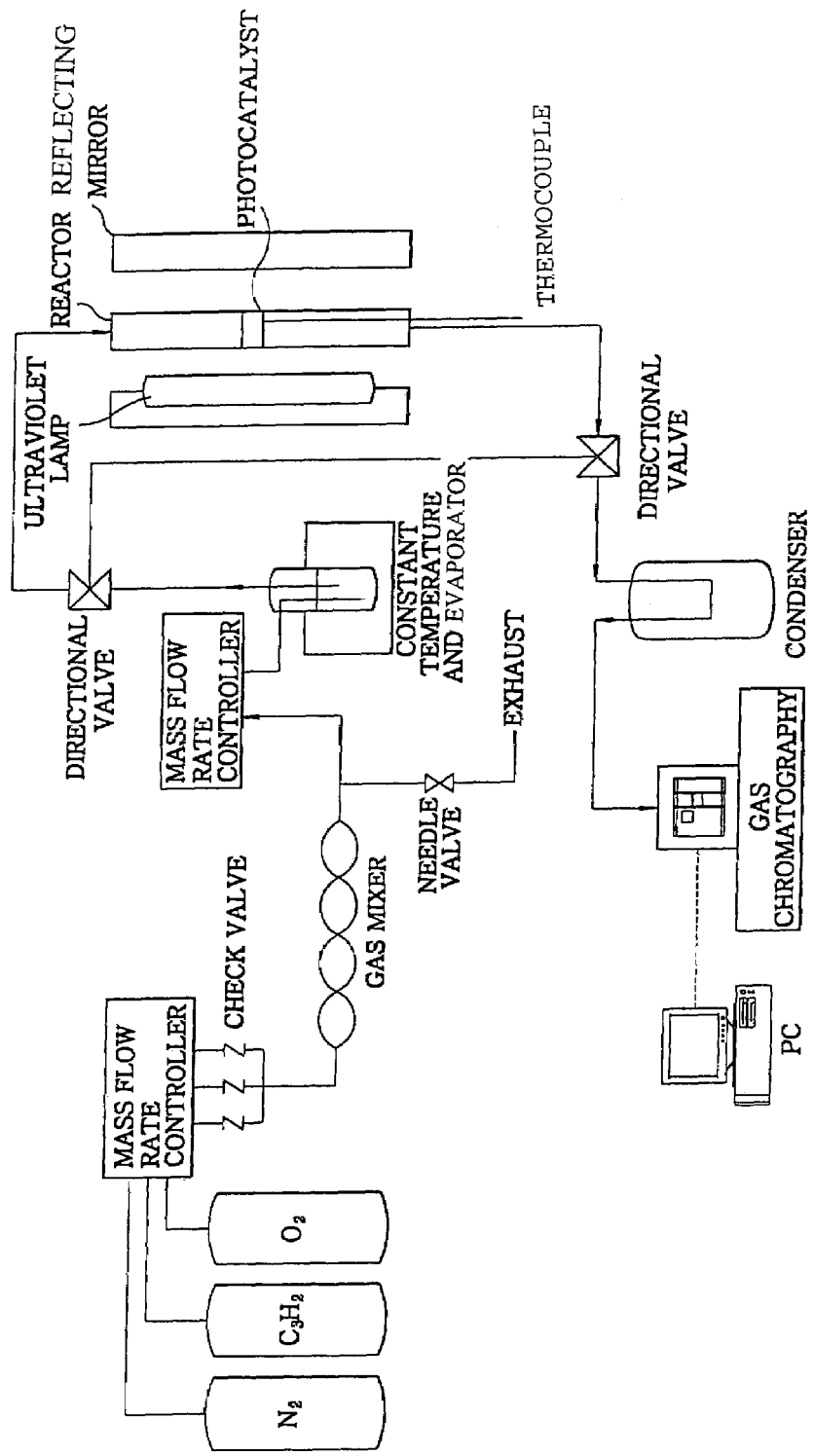
Figure 11:
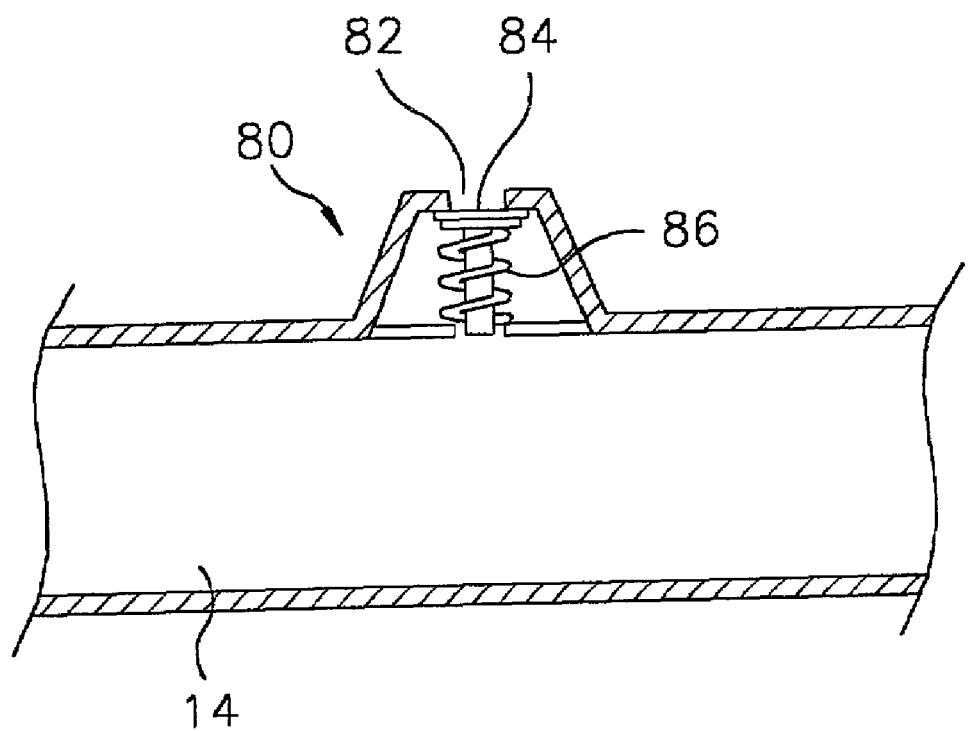
Figure 12:
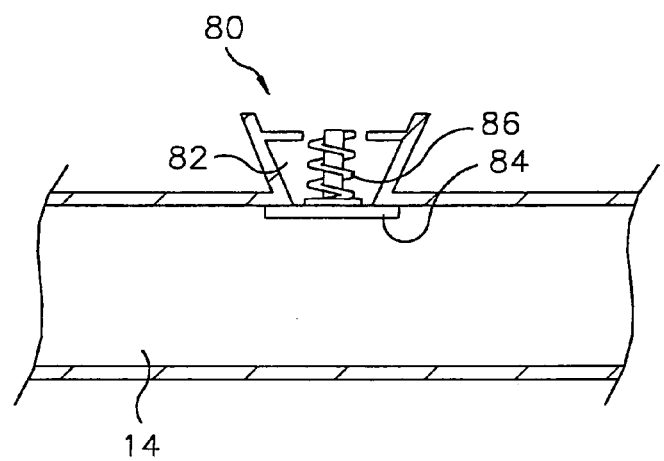
Figure 13:
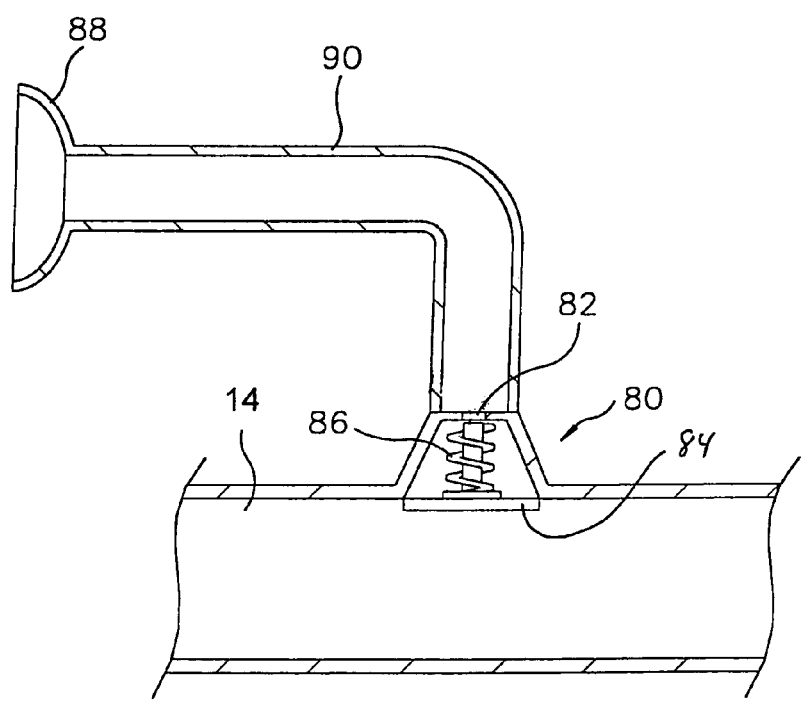
Figure 14:
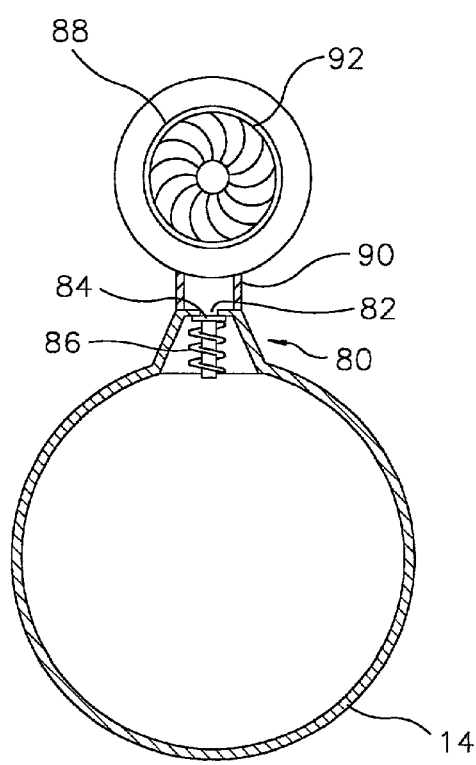
Figure 15:
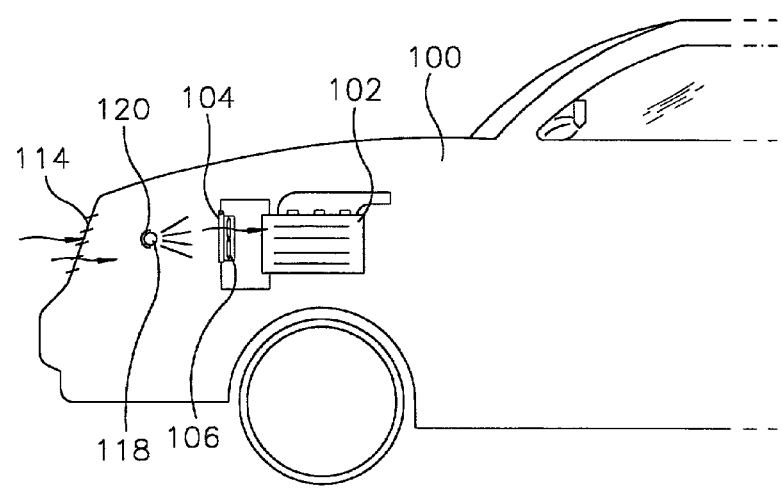
Figure 16:
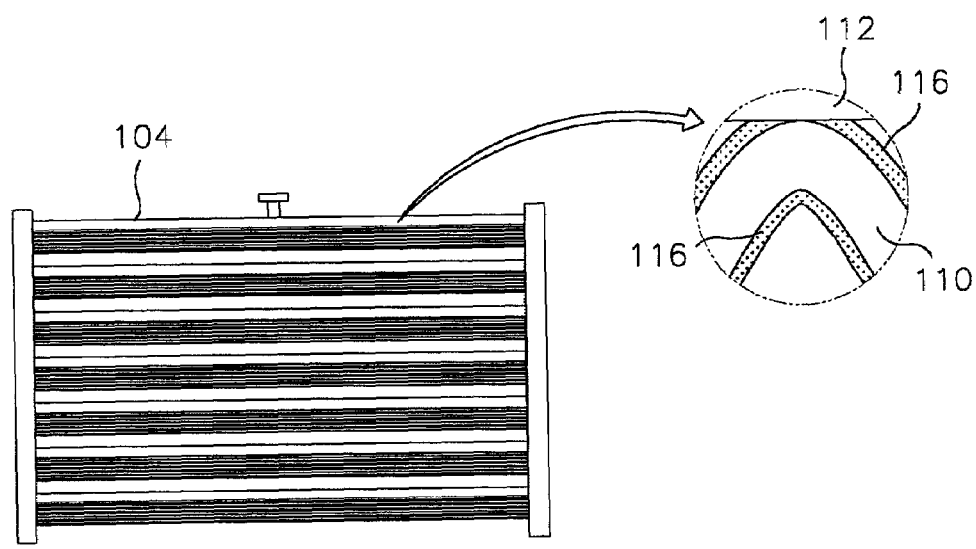
Figure 17:
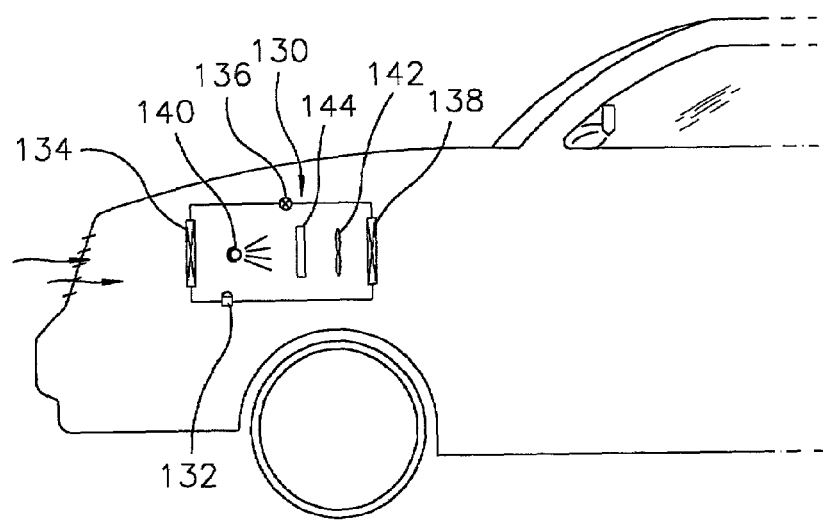
Figure 18:
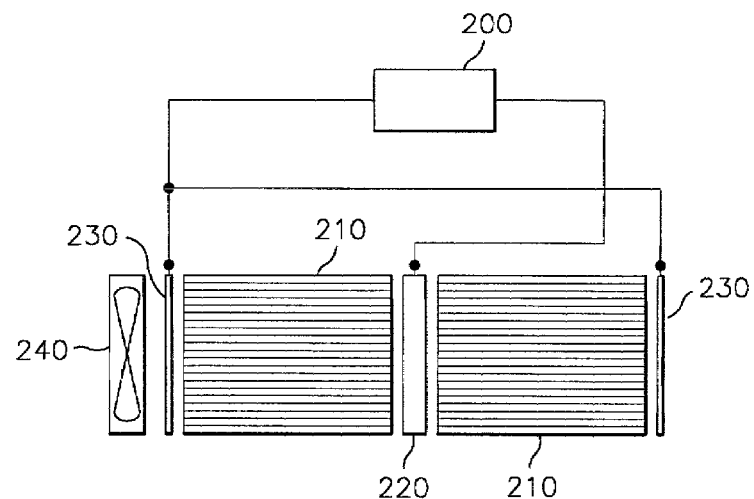
Figure 19:
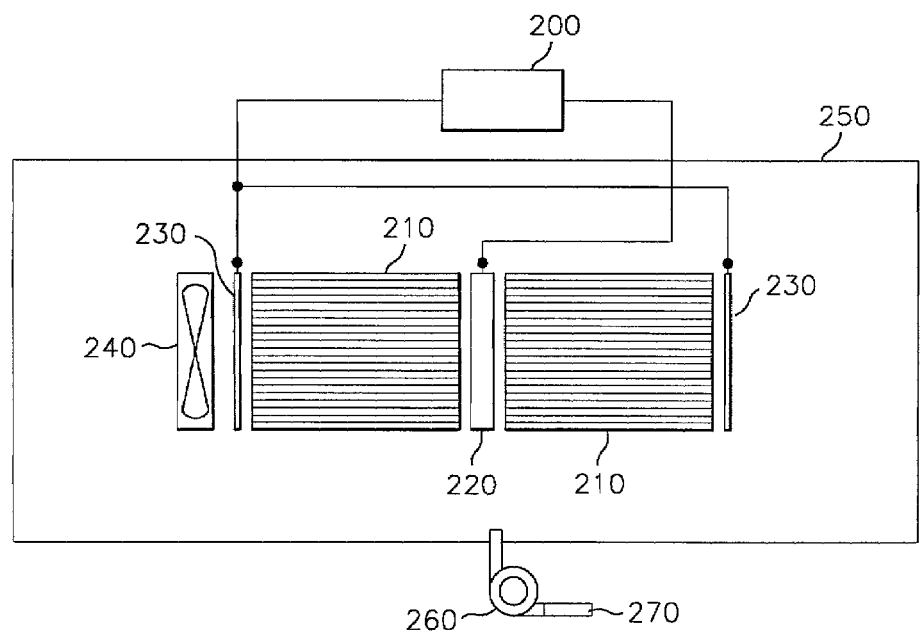
Figure 20:
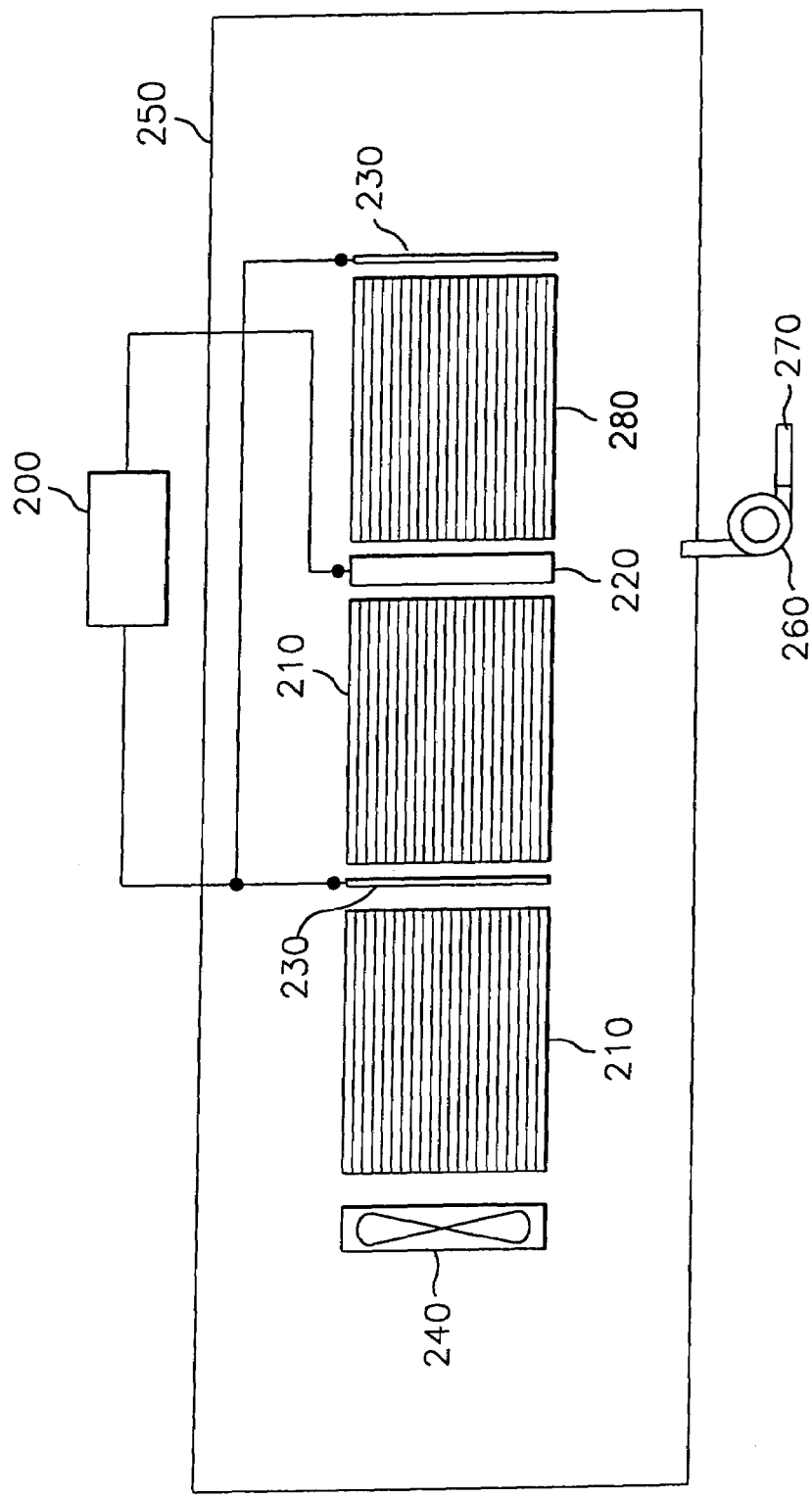

FIG. 9 describes a graph showing purification effect of exhaust gases measured by an oxygen density of gases introduced into a purification system of the exhaust gases of an internal combustion engine in accordance with the present invention;

FIG. 10 depicts a schematic view for measuring a purification effect of the exhaust gases measured in FIG. 9;

FIG. 11 indicates a schematic view when an oxygen supplying portion is disposed to an interior of an exhaust pipe in accordance with a second embodiment of the present invention;

FIG. 12 gives a schematic view when an oxygen supplying portion is disposed to an exterior of an exhaust pipe;

FIG. 13 exemplifies a schematic view showing a state that an air introducing pipe is further mounted on the oxygen supplying portion of FIG. 11;

FIG. 14 demonstrates a schematic view showing a state that a blowing fan is further mounted on the air introducing pipe of FIG. 13;

FIG. 15 employs a schematic view of an interior of an automotive vehicle for explaining an atmosphere purification system of the present invention in driving the automotive vehicle;

FIG. 16 presents a partly exploded view of a radiator in FIG. 15, in which a photocatalyst layer is coated;

FIG. 17 represents a schematic view of an interior of an automotive vehicle for explaining a purification system of the present invention using an operation of an air-conditioner in the automotive vehicle;

FIG. 18 pictures a schematic view of a photo-reactor in a deodorizing and an atmosphere purification system using a photocatalyst in accordance with a third embodiment of the present invention; and FIG. 19 and FIG. 20 show a first and a second experimenting reactors prepared to measure an efficiency of the deodorizing and the atmosphere purification system of FIG. 18 by purifying cigarette smoke.

DESCRIPTION OF SPECIFIC EMBODIMENTS

Figure 1:
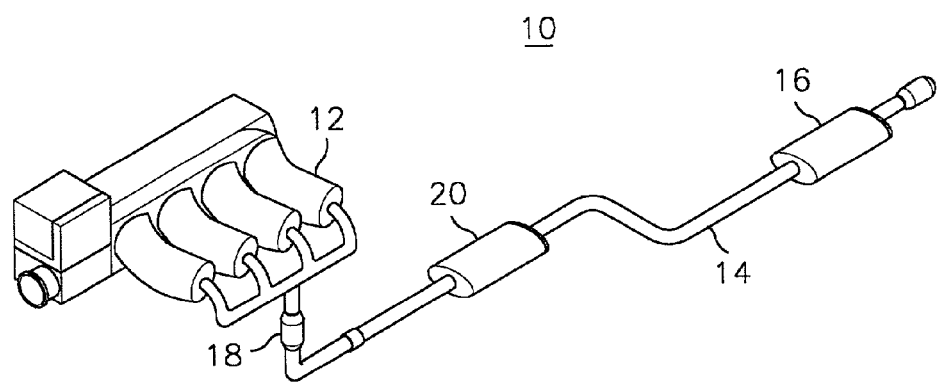
Figure 2:
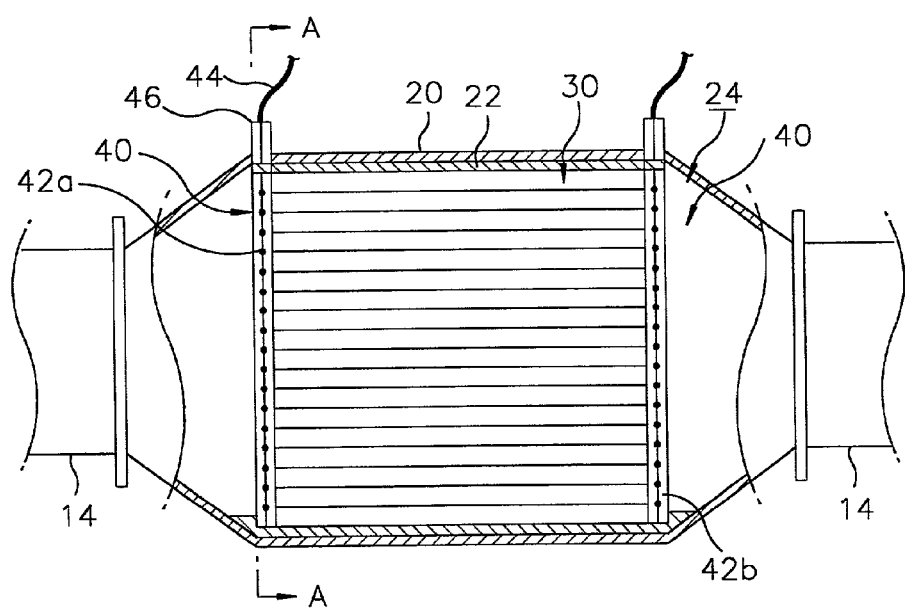
Figure 3:
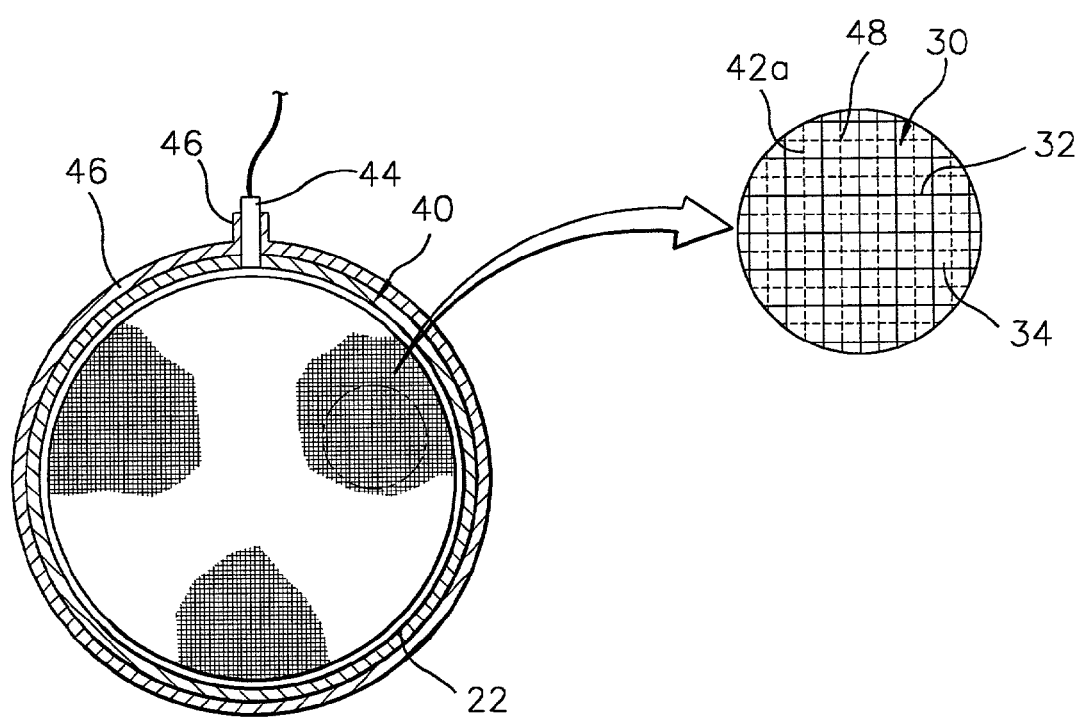

Referring now to FIG. 2 and FIG. 3 taken along line A—A of FIG. 2, there are shown an inventive purification system of exhaust gases of an internal combustion engine for vehicles in accordance with a first embodiment of the present invention, the purification system comprises a reaction furnace 20 and all its appurtenances.

The reaction furnace as shown therein is in a cylindrical form and includes an exhaust pipe 14 connected to ends thereof.

An insulating mat 22 is closely disposed to an inner surface of the reaction furnace 20, while a reactor 24 is disposed to an inner surface of the insulating mat 22. The reactor 24 includes a cylindrical honeycomb carrier 30, electrodes 40 for supplying an electric power and is disposed to both ends of the honeycomb carrier 30 to thereby form a low temperature plasma.

The honeycomb carrier 30 has a plurality of carrier cells 34, each of which is formed by extruding ceramics to thereby have a length of about 40 mm in a vertical direction. Further, each of the carrier cells 34 may be in the form of various types, for example, such as a hexagon and a triangle, but the carrier cells having a tetragon, in the first embodiment, will be described hereinafter.

Since these carrier cells 34 are disposed to the same direction as a flow of exhaust gases to allow them to be passed through therefrom.

A photocatalyst layer and a 3-way catalyst layer are coated on a surface of each of the carrier cells 34, more preferably, the 3-way catalyst layer is coated on a wall surface of each of the carrier cells 34 and the photocatalyst layer activated by a plasma photic source is coated on the coated 3-way catalyst layer.

The photocatalyst layer and the 3-way catalyst layer are formed by absorbing a photocatalyst and a 3-way catalyst in a gamma(γ) alumina having an excellent specific surface among the ceramics, respectively, the photocatalyst purifying carbon monoxide, hydrocarbon, and nitrogen dioxide before the 3-way catalyst is not activated, whereas the 3-way catalyst purifying carbon monoxide, hydrocarbon, and nitrogen dioxide in the exhaust gases after the 3-way catalyst is reached to a predetermined temperature.

Various materials may be used as the photocatalyst, but titanium dioxide($TiO_2$) is used in this embodiment. The photocatalyst is excited by a specific wavelength, this process is expressed as following reaction formula;

$TiO_2(h+)+e^-$ is an ion having very strong reactivity, thereby exciting $H_2O$ or $O_2$ and then accelerating and redoubling a production of a free radical. These are already known and described in detail in a reference regarding the photocatalyst(J. of Adv Oxid. Technol Vol., No. 1, 1996. p67–78).

A mixture mixed platinum with rhodium is usually used as the 3-way catalyst, but it is preferable that the mixture may further include palladium.

On the other hand, each of the electrodes 40 is comprised of a pair of wire meshes 42a and 42b, each having a plurality of electrode cells by crossing wires, the wires being made of a conductive material. Each of the wire meshes 42a and 42b is disposed at an interval from both ends of the honeycomb carrier 30, and, more preferably, the wire mesh 42a is disposed to one end of the honeycomb carrier 30 is disposed at a certain distance from the honeycomb carrier 30, while the wire mesh 42b disposed to the other end of the honeycomb carrier 30 is closely disposed to the honeycomb carrier 30. For example, the distance between the honeycomb carrier 30 and the wire mesh 42a is about 1–40% of the honeycomb carrier length and is preformed as 2 mm, 4 mm and 5.5 mm, respectively, in this embodiment.

Since the wire meshes 42a and 42b are made of conductive material, the wire meshes 42a and 42b are conducted through the honeycomb carrier 30 when a power supply is applied to the wire meshes 42a and 42b.

Each of the wire meshes 42a and 42b is connected to a terminal 44 extended externally of the reaction furnace 20. An insulator 46 is formed on an outer surface of the terminal 44 to thereby insulate from the reaction furnace 20. The terminal 44 is connected to an external power supply. It may use AC or DC as the power supply, but AC power supply of 20 KV and 20 mA is used in this embodiment.

It is preferable that junctions 48 formed by crossing wires of each of the wire meshes 42a and 42b are located at a center of each of the carrier cells 34, but may be located in the vicinity of an edge of each of the carrier cells 34 because the position of the junctions 48 is changed depending upon an amount of the exhaust gases to be treated and a concentration of pollutants in the exhaust gases.

The longer the distance between the honeycomb carrier 30 and the electrode 40 in the reaction furnace 20 as constructed above is the more power consumption is while a photic amount of plasma increases. Hence, in order to simultaneously satisfy the photic amount of plasma and an energy effect in the present invention, one electrode 40 is closely disposed to one end of the honeycomb carrier 30, while the other electrode 40 is far from the other end of the honeycomb carrier 30.

Further, it is preferable that a volume and a number of the carrier cells 34 and the electrode cells are varied depending upon the amount of the exhaust gases and the concentration of the pollutant therein. That is, the volume and the number of the electrode cells are varied depending upon the variation of those of the carrier cells, the carrier cells having 100–900 numbers per unit area (1 inch×1 inch).

In accordance with a preferred embodiment of the present invention, the operation of the purification system of the exhaust gases in an internal combustion engine will now be described hereinbelow.

When the exhaust gases are introduced into the reaction furnace 20 by an operation of the internal combustion engine and, at the same time, a power supply is applied through the terminal 44 to the electrodes 40, a plasma is generated at the junctions 48 of the wire meshes 42a and 42b of the electrodes 40.

At this time, since the junctions 48 are located at center of each of the carrier cells 34 and the honeycomb carrier 30 is made of ceramic to thereby apply an electric current thereto, the respective electrodes 40 located at both ends of the carrier cells 34 are conducted to allow the plasma to be discharged in each of the carrier cells 34.

When the wire mesh 42a is disposed at an interval from the honeycomb carrier 30 and the wire mesh 42b is closely disposed thereto, the photic amount generated at the wire mesh 42a is larger than that generated at the wire mesh 42b and, in this case, the consume power is smaller than that at the wire meshes 42a and 42b disposed at an interval from the honeycomb carrier 30.

Further, when the wire meshes 42a and 42b are closely disposed to the honeycomb carrier 30, the consume power is reduced, but it cannot be obtained to a desired purification effect because a plasma photic amount becomes low.

The plasma generated as described above actives the photocatalyst of the photocatalyst layer coated on a wall 32 of the carrier cells 34 to thereby produce a free radical capable of purifying unburned hydrocarbon and nitrogen oxide.

Since the plasma is diverged from the junction of the electrodes 40 to each of the carrier cells 34, the photocatalyst reaction is introduced by small energy. Further, the exhaust gases are purified and, at the same time, additional heats are supplied to an existing heat in the exhaust gases because the photocatalyst reaction is mostly exothermic reactions, allowing heats to be transmitted to the 3-way catalyst layer coated to a lower portion of the photocatalyst layer.

The 3-way catalyst is further activated due to the transmitted heats to thereby improve the purification of carbon monoxide, hydrocarbon, nitrogen oxide and the like.

The 3-way catalyst moves up an activation reaching time relative to the purification reaction using only heats in the exhaust gases such as the prior art. Further, in the purification reaction of the present invention, the photocatalyst reaction and the 3-way catalyst reaction are concurrently performed, thereby greatly increasing the purifying effect. Furthermore, the purification reaction is added by a free radical generated by the plasma, further increasing the effect.

Also, since power consumes amount generating the plasma are properly maintained, the purification effect as well as energy effect are improved.

Figure 4:
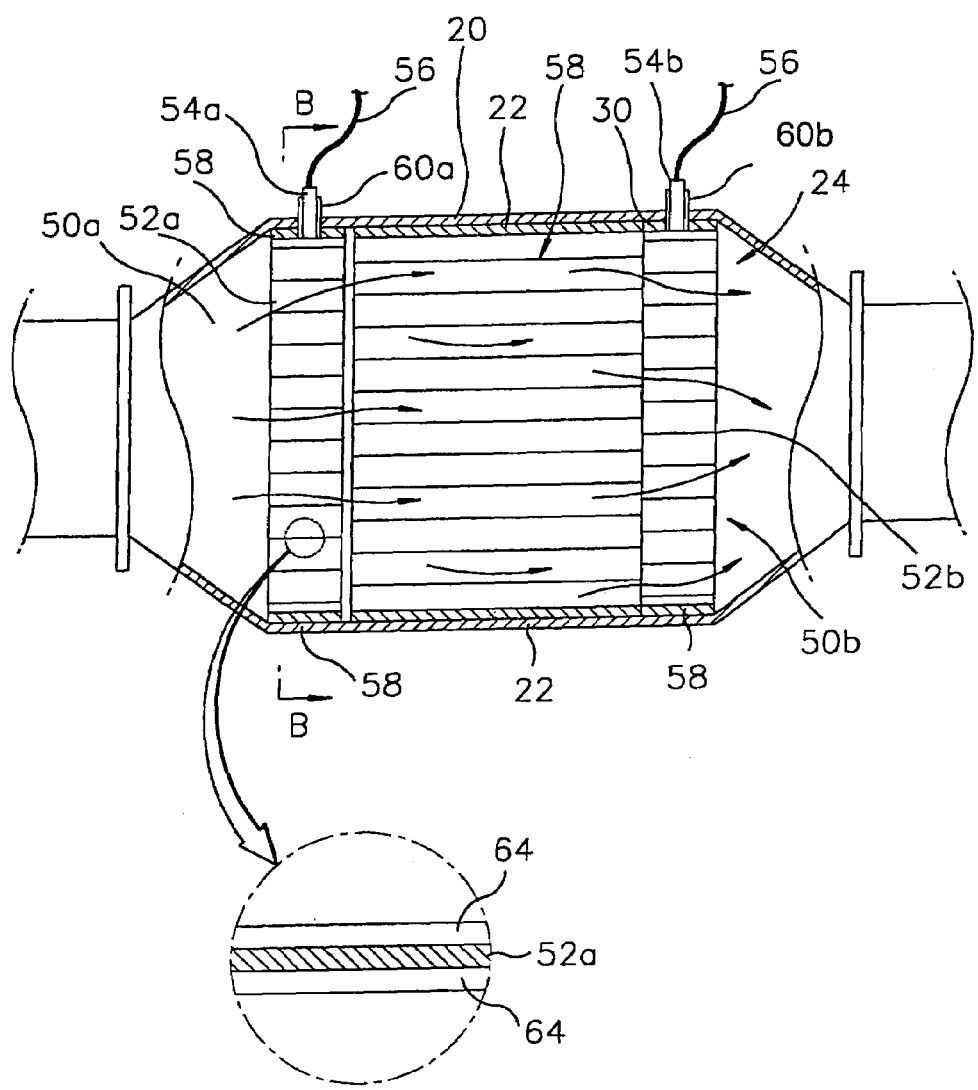
Figure 5:
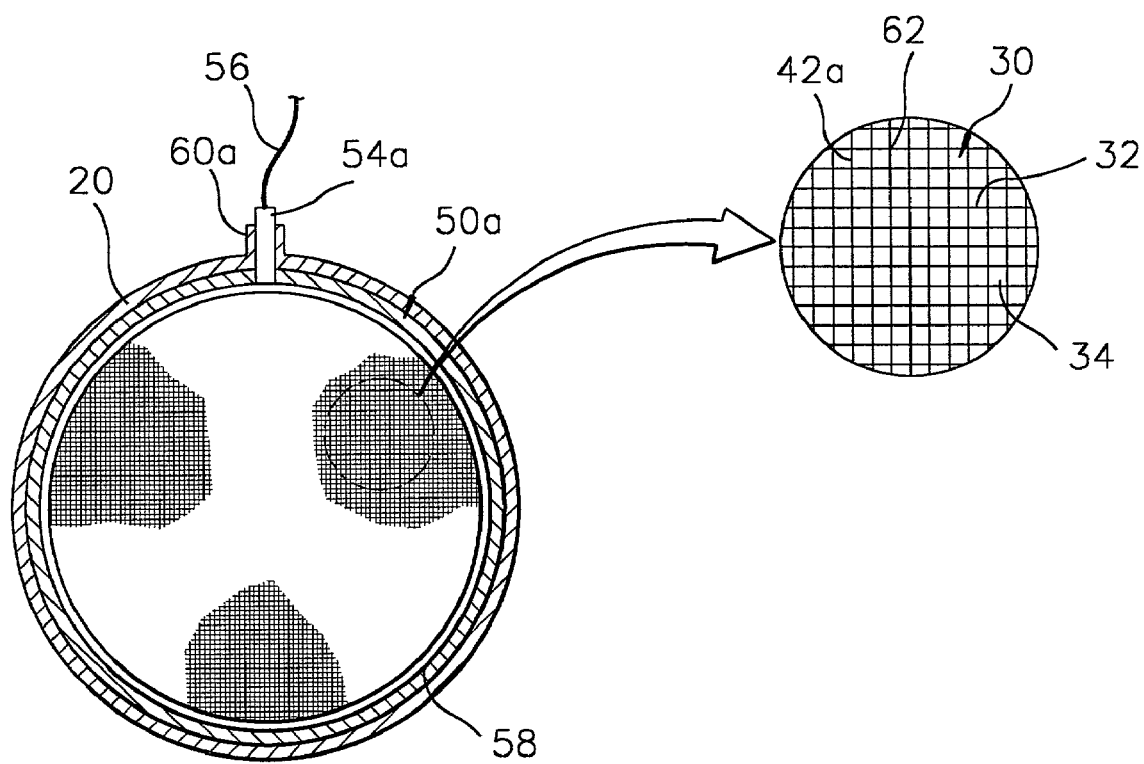

FIG. 4 is a modifying embodiment of FIG. 2, wherein a reactor employs a honeycomb electrode as an electrode therein. FIG. 5 is taken along A—A lines in FIG. 2.

The electrodes 50a and 50b are disposed to both ends of the honeycomb carrier 30 being similar to that of FIG. 2. Further, the electrodes are in the form of a cylindrical and formed to have a predetermined length in a vertical direction, the cross section thereof being of a honeycomb type having a plurality of electrode cells 52a and 52b as described above, thereby having durability to an external impact. These electrode cells 52a and 52b may be prepared in the form of various type such as triangle and hexagon, but in the modification embodiment it is in the form of a tetragon as described above.

These honeycomb electrodes 50a and 50b may be distinctly disposed from both ends of the honeycomb carrier 30, but it is preferable that the honeycomb carrier 50a disposed to one end of the honeycomb carrier 30 is distinctly disposed from the honeycomb carrier 30, whereas the honeycomb carrier 50b disposed to the other end thereof is closely disposed to the honeycomb carrier 30.

For example, when the length of the honeycomb carrier 30 is about 40 mm, the distance between the honeycomb carrier 30 and the honeycomb electrode 50a is about 1–40% of the honeycomb carrier length and is performed as 2 mm, 4 mm, and 5.5 mm, respectively, in this embodiment.

It is preferable that the honeycomb electrodes 50a and 50b are made of a metal having conductibility capable of conducting between the honeycomb electrodes.

It is preferable that the honeycomb electrodes 50a and 50b are in the form of a disc, the diameter thereof being similar to that of the honeycomb carrier 30. Extended to an exterior of the reaction furnace 20 are electrode terminals 54a and 54b which are disposed to an outer periphery of each of the honeycomb electrodes 50a and 50b to be thereby connected to the power supply 56. It may use AC or DC as the power supply 56, but in this modified embodiment, AC power supply of 20 KV and 20 mA is used.

If the reaction furnace 20 is made of metal, an electrode-insulating mat 58 is sandwiched between an outer periphery of the honeycomb electrodes 50a and 50b and the reaction furnace 20 in order to prevent the furnace from being conducted to the honeycomb electrodes.

Further, insulating members 60a and 60b are disposed to an outer periphery of the electrode terminals 54a and 54b, respectively, preventing the furnace from being conducted to the terminals.

The honeycomb electrodes 50a and 50b disposed to both ends of the honeycomb carrier 30 may be far from both end surfaces of the honeycomb carrier 30 so as to allow the plasma to be discharged from each of the edges of the electrode cells 52a and 52b in a direction of the honeycomb carrier 30, but each of the honeycomb electrodes 50a and 50b is distinctly or closely disposed from/to both ends of the honeycomb carrier 30 in order to obtain a proper purification effect and to improve an energy effect.

On the other hand, the 3-way catalyst layer 64 is formed on a surface of each of the electrode cells 52a and 52b and comprises the steps of: coating a wash-coat on the surface of each of the electrode cells 52a and 52b, and depositing the wash-coat in the 3-way catalyst.

A mixture of platinum with rhodium is used as the 3-way catalyst being similar to that coated on the honeycomb carrier 30 as described above, but the mixture further includes palladium.

Accordingly, the inventive purification system can improve the purification efficiency by performing the purification reaction at the honeycomb carrier 30 as well as the honeycomb electrodes 50a and 50b.

In the honeycomb electrodes 50a and 50b in accordance with this embodiment, it is preferable that each of the edges 62 of the electrode cells 52a and 52b may be located at center of each of the carrier cells 34 or at the respective edges of each of the carrier cells 34. This means that a location of the respective edges is varied depending upon the amount of the exhaust gases to be purified and the concentration of pollutants therein.

In the same manner as described for the embodiment of FIG. 2, a magnitude and a number of the carrier cells 34 and the electrode cells 52a and 52b are varied depending upon the amount of the exhaust gases and the concentration of pollutants therein.

The operation of the purification system of the exhaust gases in an internal combustion engine in accordance with a modified embodiment of the present invention will be described hereinbelow.

When the internal combustion engine operates, the exhaust gases are introduced into the reaction furnace 20 and, at the same time, a power supply 56 is applied to the electrode terminals 54a and 54b to thereby allow a current to flow into the honeycomb electrodes 50a and 50b located at both ends of the honeycomb carrier 30.

Hence, a plasma is discharged from an edge 62 of the electrode cell 52a located at one end of the carrier cell 34 to the edge 62 of electrode cells 52b located at the other end thereof. At this time, the edge 62 is located at a center of each of the carrier cells 34 and the honeycomb carrier 30 is made of ceramic to thereby prevent a current from flowing therethrough, the honeycomb electrodes 50a and 50b located at both ends of the honeycomb carrier 30 are conducted to each other to allow the plasma to be discharged into an internal portion of each of the carrier cells 34.

The plasma photic amount generated at the honeycomb electrode 50a distinctly disposed from the honeycomb carrier 30 is larger than that generated at the honeycomb electrode 50b closely disposed to the honeycomb carrier 30. In order to obtain an additional plasma photic amount, all of the honeycomb electrodes 50a and 50b are distinctly disposed from the honeycomb carrier 30, but it is preferable that one electrode 50a is closely disposed to the honeycomb carrier 30, while the other electrode 50b is distinctly disposed therefrom.

The discharged plasma activates the photocatalyst of the photocatalyst layer coated on a surface of the carrier cells 34 to thereby produce a free radical, purifying unburned hydrocarbon, nitrogen oxide, and carbon monoxide. Since the photocatalyst reaction shows a regular purification capability in all of the ranges of the mixture ratio regardless of the theoretic mixture ratio of an internal combustion engine, the purification capability is continuously maintained although the engine is operated at a range ratio, not just at the theoretical mixture ratio. range exception of the theoretic mixture ratio.

Since the plasma is discharged from the edges 62 of the electrode cells 52a and 52b to each of the carrier cells 34, the photocatalyst reaction is introduced by only small energy. Further, since the honeycomb electrodes 50a and 50b are distinctly and closely disposed, the photocatalyst reaction is introduced by a proper plasma photic amount to thereby improve energy effect.

The exhaust gases are purified and, at the same time, additional heat is supplied to an existing heat in the exhaust gases because the photocatalyst reactions are mostly exothermic reactions, allowing heat to be transmitted to the 3-way catalyst layer coated to a lower portion of the photocatalyst layer.

The 3-way catalyst is activated due to the transmitted heats to thereby purify a carbon monoxide, a hydrocarbon, and a nitrogen oxide. That is, assuming the swerve from the theoretic ratio of the internal combustion engine, when the exhaust gases are exhausted by a combustion of lean condition having an abundant oxygen, the catalyst oxidizes unburned hydrocarbon and carbon monoxide, while when the exhaust gases are exhausted by a combustion of a condition having a poor oxygen, the catalyst deoxidizes nitrogen oxide.

In the purification system of the internal combustion engine in accordance with the present invention, the 3-way catalyst reaction is performed by heat produced while generating the plasma at the honeycomb carrier 30 as well as a surface of the electrode cells 52a and 52b of the honeycomb electrodes 50a and 50b to thereby purify the exhaust gases and, further, although the plasma is not generated, the purification reaction is continuously maintained, thereby improving the purification efficiency.

The 3-way catalyst concurrently reacted at the honeycomb carrier 30 and the honeycomb electrodes 50a and 50b moves up an effective activation time more than that is a purification reaction using heat in the exhaust gases such as the prior art. Further, in the purification reaction of the present invention, the photocatalyst and the 3-way catalyst reactions are concurrently performed, thereby maximizing the efficiency. Furthermore, an additional purification reaction is carried out by a free radical generated by the plasma, thereby increasing the effect and, although the plasma is not generated, the purification reaction is also improved by generating the 30 way catalyst reaction due to the additional heat generated in the exhaust gases.

Also, since power generating the plasma is properly maintained, the purification as well as energy efficiency is improved.

Figure 6:
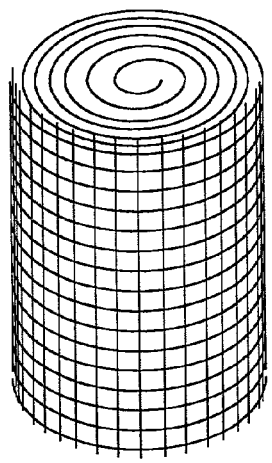
FIG. 6, FIG. 7A and FIG. 7B are a perspective view, a front sectional view and a cross sectional view showing another modification of FIG. 2, wherein a wire mesh roll and a punched plate are employed as an electrode, respectively.
Figure 7A:
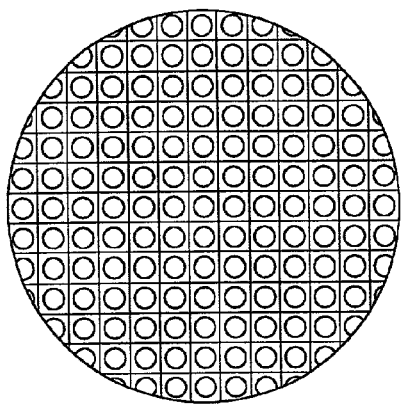
Figure 7B:

As shown in FIG. 6 and FIGS. 7A and 7B as another modifying embodiment, wherein a reactor employs a wire mesh roll or a punched plate as an electrode therein, allowing a plasma to be discharged to a ceramic carrier cell. The construction of this embodiment is similar to that of the above described embodiment and the modified embodiment and, in the same manner of the embodiment in FIG. 2, it is preferable that the junctions formed by crossing the wires of the wire mesh rolls or the projections provided in the punched plate are located at a center of each of the carrier cells, but it is of course that the junctions or the projections may be located in the vicinity of edges of each of the carrier cells depending upon the amount of the exhaust gases and a concentration of pollutants therein.

Figure 8:
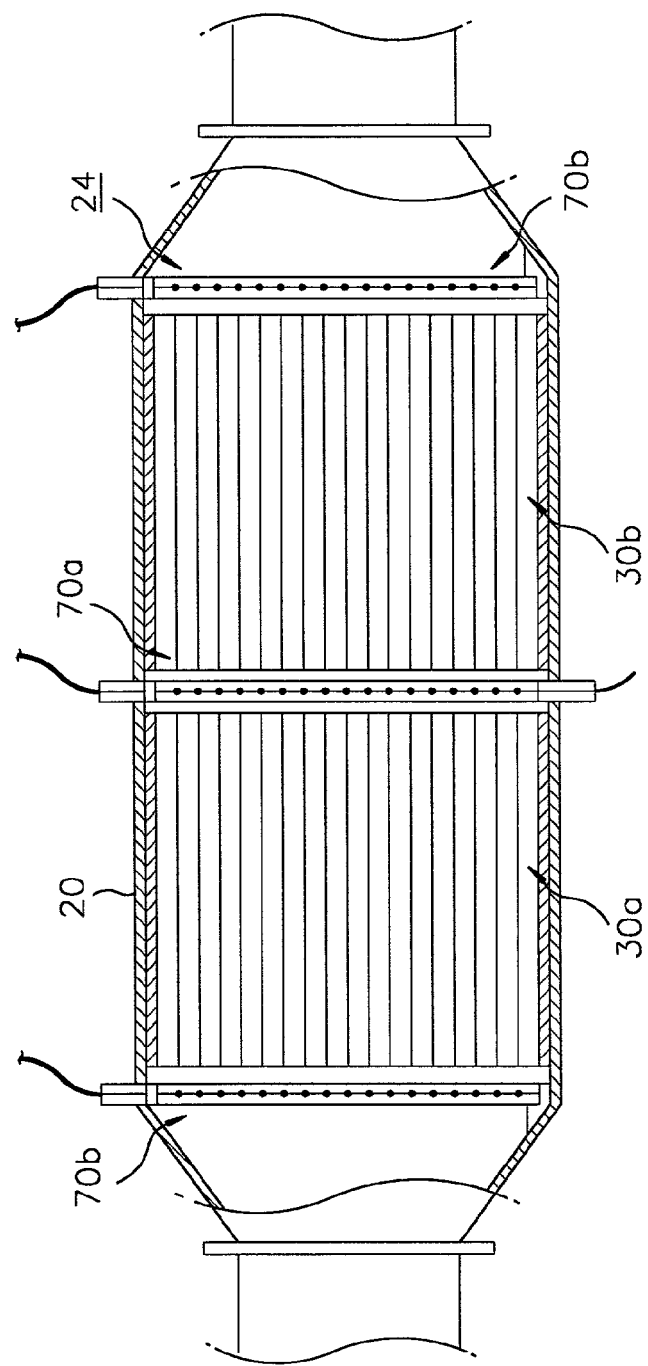
FIG. 8 illustrates a cross sectional view showing an inner portion of a reaction furnace in which the reactors of FIG. 2 are connected to each other.

The above description is that for a case when only one reactor is mounted on the reaction furnace, but the reactor as described above may be pluralized to thereby improve the efficiency of the purification system and may be properly disposed depending upon an amount of the pollutants included in the exhaust gases. In FIG. 8, a number of reactors 24 of FIG. 2 are pluralized in the reaction furnace 20.

Further, an electrode 70a between the honeycomb carriers 30a and 30b is distinct therefrom at a regular distance, e.g., about 1–40% of the honeycomb carrier length when the length is about 40 mm, while an electrode 70b at tip ends of each of the honeycomb carriers 30a and 30b is closely disposed thereto. The operation thereof operates in the same manner as described at the above embodiments.

The electrodes as disposed above can utilize the wire meshes 42a and 42b or the honeycomb electrodes 52a and 52b between the honeycomb carriers 30 or to both ends thereof and it may use the wire mesh together with the honeycomb electrode in some cases. Further, a wire mesh roll may be disposed between the honeycomb carriers 30 and a wire mesh, a honeycomb carrier or a punched plate may use to both ends of the wire mesh roll as not shown.

On the other hand, these inventors noticed that an exhausting purification effect is improved depending upon an oxygen concentration of exhaust gases introduced into an exhaust gases purification system of an internal combustion engine as shown in FIG. 9. An experiment device as shown in FIG. 10 is used in order to measure the effect, the device comprising a gas supplying portion, a ultraviolet reacting portion, and an analyst portion.

In the experiment, propane gases(C3H8) of 500 ppm have been used as a main reaction gas and is supplied together with oxygen and nitrogen of 21% into a mixing chamber, the concentration thereof being regularly maintained to 500 ppm by controlling a flow rate of oxygen and nitrogen, thereby controlling the concentration of oxygen in whole mixing gases. The flow rate of the mixing gases is 21/min and is controlled using a mass flow controller.

The mixing gases as prepared above are exhausted in part before these are supplied into the reaction furnace to thereby allow the flow rate of the gases taking part in the reaction to be regularly maintained. Further, moisture in the reaction gases is supplied as a desired concentration using a water bath by which an evaporator is set to a predetermined temperature. The practice composition of gases in the reaction experiment consists of a propane 500 ppm, oxygen of 0.84–10% and moisture of 2–12%, that is, oxygen and nitrogen having a difference concentration, respectively, are supplied into a catalyst layer.

The photic source required to a photo activity employs an ultraviolet lamp of 200 W filled with mercury having a main wavelength of 360 nm. The reactor is a quartz tube having a diameter of 3/8" and a length of 250 mm and a quartz filter is provided with a middle portion of the reactor. It is equally treated in all experiments that the flow rate of the reaction gases introduced into the reactor is 30 cc/mm and a catalyst amount is 0.05 g and a compressed air is supplied around an ultraviolet lamp in order to press a zooming of the reaction temperature due to heat discharged from the lamp.

The concentration variation of the propane before and after the reaction is analyzed using a gas chromatography, HP 5890 provided with a Flame Ionization Detector(FID) and the analyzing conditions are as following table 1.

TABLE 1

| The experiment condition of the gas chromatography | |
|---|---|
| Column | 1/8" r-A1203 packed column |
| Director temperature | FID, 200° C. |
| Injector temperature | 100° C. |
| Oven temperature | 150° C. |
| Carrier gases | Helium gases, 30 cc/min |
| Sampling parts | 6-port plate, 2 minutes interval |

FIG. 9 shows an exhausting purification efficiency (propane conversion rate) according to an oxygen concentration measured by the experiment method of table 1. As known in FIG. 9, it is noticed that when the oxygen concentration is increased up to 5%, the efficiency (is greatly increased, while when the concentration is increased by 5% or more, the increasing rate of the efficiency is significantly decreased and when the concentration is below 50%, the increasing rate is low as below 80%.

Accordingly, in the photocatalyst system, when the oxygen concentration of the exhaust gasses in the exhausting pipe is artificially maintained at 5% or more, the efficiency of the system is improved.

Using these characteristics, the exhaust gas purification system in accordance with the present invention is provided with an oxygen supplying portion 80 in an exhausting pipe 14 located at forward of the reaction furnace thereof in order to improve the exhausting purification effect.

The oxygen supplying portion 80, as shown in FIGS. 11 and 12, includes a plate 84 for closing an inlet port 82, and a spring 86 compressed and extended by a difference between a pressure in the exhausting pipe 14 and an atmospheric pressure.

As shown in FIG. 11, in case of installing the oxygen supplying portion 80 in the exhausting pipe 14, when the pressure in the reaction furnace is lower than the atmospheric pressure, a force for pushing the plate 84 by the atmospheric pressure is introduced to the spring 86, while when the difference is larger than the stiffness of the spring 86, the spring 86 is compressed to thereby open the plate, resulting in external air being introduced into the exhausting pipe 14. That is, if the atmospheric pressure Po is larger than the sum of the pressure Pi in the exhausting pipe 14 and the pressure Ps of the spring 86, the plate 84 is opened as following formula:

*Po>Pi+Ps*

As shown in FIG. 12, in case of installing the oxygen supplying portion 80 to an exterior of the exhausting pipe 14, if Po+Ps>Pi, the plate 84 is opened to thereby allow the external air to be introduced into the exhausting pipe 14. The operation thereof is the same as described above.

In a modification as described above, but not shown, the oxygen supplying portion 80 may be further provided with a solenoid valve and then the oxygen concentration in the exhausting pipe 14 may be increased by controlling the solenoid valve linked with a timer or a controller to allow the external air to be introduced into the exhausting pipe 14.

The oxygen supplying portion 80 may further include an air introducing pipe 90 having an opening port 88 as shown in FIG. 13. Also, the air introducing pipe 90 may further include a blowing fan 92 therein to thereby artificially increase a pressure to the plate 84 and to thereby allow the external air to be easily introduced into the exhausting pipe 14, resulting in the oxygen concentration in the exhausting pipe 14 being increased.

On the other hand, the invention may be used as an atmosphere purification system using an operation of an air-conditioner and a driving of vehicles.

As shown in FIG. 15, a radiator 104 is connected as a heat exchanger to an internal combustion engine 102 disposed in an engine room 100 of vehicles. Cooling water is circulated between the internal combustion engine 102 and the radiator 104 to thereby allow heat generated in operating the internal combustion engine 102 to be discharged externally.

The radiator 104 is provided with a cooling fan 106 for rotating at a low or a high speed according to a driving condition and a traveling speed of vehicles to allow an introduced air to be blown to the radiator 104. Further, the radiator 104 includes a plurality of cooling pins 110 so as to maximize a surface area, resulting in that energy contained in the cooling water flowing through a cooling pipe 112 is speedily discharged externally.

A grille 114 is disposed to a front portion of the vehicle to introduce air therethrough, thereby passing through the radiator 104 in a moving vehicle.

In the vehicles as constructed above, a photocatalyst is coated on the radiator 104 of the inventive atmosphere purification system in accordance with the present invention and, more preferably, a photocatalyst layer 116 in which the photocatalyst is deposited is coated on a surface of the cooling pin 110. Various types of photocatalysts may be used, but the atmosphere purification system in accordance with the present invention utilizes titanium dioxide ($TiO_2$). As described above and is well known, the photocatalyst is excited by a specific wavelength, the process is expressed as the following reaction formula:

$TiO_2$ (h+)+e$^-$ is an ion having a very strong reactivity, thereby exciting $H_2O$ or $O_2$ and then accelerating and redoubling a production of a free radical (J. of Adv Oxid. Techol Vol., No. 1, 1996, p67–p78). These photocatalysts are deposited in a carrier such as a gamma alumina to thereby form a photocatalyst layer.

The photic source for exiting the coated photocatalyst utilizes sun's ray irradiated to an engine room 100 through a grille 114 of vehicles or a ultraviolet lamp 118 for irradiating an ultraviolet ray in a neighboring position of the radiator 104. The wavelength of the ultraviolet ray irradiated from the lamp 118 is about 360 nm.

The ultraviolet lamp 118 is provided with a reflective mirror 120, wherein it is preferable that an inner side of the reflective mirror 120 is directed to the radiator 104 to thereby protect the ultraviolet lamp 118 from a pressure due to a flow rate of air introduced through the grille 114 in traveling vehicles and to thereby reflect the ultraviolet ray irradiated from the ultraviolet lamp 118, thereby increasing an irradiating amount of the ultraviolet ray to the radiator 104.

According to the above construction, since the inventive atmosphere purification system allows air to always flow through the grille 114 to the radiator 104 in traveling of the vehicles, when the air passes through the radiator 104, the photocatalyst of the photocatalyst layer 116 is excited by the ultraviolet ray irradiated from the ultraviolet lamp 118 to thereby form a free radical capable of purifying pollutants such as VOC (volatile organic components) and nitrogen oxide contained in the air.

At this time, the rotating speed of the cooling fan 106 is also varied depending upon the traveling speed of vehicles and the air is continuously supplied into the radiator 104, thereby continuously purifying the air.

Further, the inventive atmosphere purification system can use the operation of an air conditioner mounted on vehicles as follows:

As shown in FIG. 17, the air conditioner 130 comprises a compressor 132, a condenser 134, an expansion valve 136 and an evaporator 138 and can cool an interior of the vehicle by a state change of a refrigerant circulating therein. The condenser 134 is provided with a plurality of cooling pins in order to easily perform a heat exchange, a photocatalyst layer containing a photocatalyst being coated on the pins. Further, when the photic source 140 as described above is adjacent to the condenser 134, the air can be purified in the same manner as described above.

On the other hand, a cooling fan 142 is closely disposed to the evaporator 138 in order to allow a heat-exchanged cold air to be introduced into the interior and an air introducing port for smoothly introducing the air thereinto is disposed. Further, an inorganic filter 144 made of metal or inorganic substance is usually disposed in the air introducing port for removing contaminants contained in the introduced air. Accordingly, if the photocatalyst layer in accordance with the present invention is coated on the filter 144, the introduced air into the interior of vehicles is also purified.

Also, the present invention can be applied to a deodorizing and atmosphere purification system using the photocatalyst as shown in FIGS. 18 to 20.

As shown in FIG. 18, a wire mesh roll electrode 220 is disposed between two ceramic honeycomb carriers 210 having a diameter of 55 mm and a length of 40 mm, a photocatalyst being coated on the carriers, while wire mesh electrodes 230 are disposed to each of the ends of each of the honeycomb carriers 210, respectively. Further, the wire mesh roll electrode 220 is connected to one end of a power supply 200, whereas the wire mesh electrodes 230 are connected to the other end of the power supply 200. The power supply 200 to be supplied is boosted from 220V of AC to 20,000V, a change period of the electric poles thereof being 60 Hz. Further, a reference number 240 denotes a small-sized fan disposed to one end of the carriers 210 for supplying pollutants contained in the air into the inventive deodorizing and atmosphere purification system.

A reactor as shown in FIGS. 19 and 20 is to evaluate the capability of the deodorizing and atmosphere purification system in accordance with a third embodiment of the present invention. Referring now to FIG. 19 as a first experiment example, the deodorizing and air purification system is disposed to a transparent instrument 250 provided with a small-sized pump 260 to thereby allow a smoke of a cigarette 270 to be compulsorily transmitted to an interior of the transparent instrument 250.

Lighting the cigarette 270, the compulsory transition operated by the small-sized pump 260 is performed until the interior of the transparent instrument 250 is invisible by the smoke of the cigarette. Then, the operation of the pump 260 stops and a photic reaction is introduced by supplying a power from the power supply 200 into the small-sized fan 240 and the electrodes 230 to thereby cause the air to be introduced into the photic reactor, resulting in that the cigarette smoke and the smoking smell are completely removed from the transparent instrument 250 after 10–20 seconds. The consumed power is 120 watt.

Referring now to FIG. 20 as a second experiment example, a honeycomb type, a pulverized type, or a sponge type carrier 280 is disposed to a front of the reactor as shown in FIG. 19, an activated carbon being coated on the carrier. The cigarette smoke is removed just after the pump 260 is operated, e.g., about 3 seconds later. In this case, since the carrier is disposed to the front of the photic reactor and the activated carbon coated on the carrier 280 absorbs the cigarette smoke of a high concentration, the activated carbon serves as a kind of damper for preventing the cigarette smoke from being suddenly introduced into the photic reactor. The cigarette smoke having a reduced concentration by the activated carbon is easily purified from the photic reactor and then components of the cigarette smoke absorbed to the activated carbon are progressively deodorized and purified in the photic reactor.

As described above, the exhaust gas purification system of the internal combustion engine in accordance with the present invention can improve the energy efficiency by increasing the purification efficiency and reducing power consumption relative to the prior art. That is, the plasma generated at an electrode by the supply of the power introduces a photic reaction and the heat generated in the reaction and the heat in the exhaust gases redouble a 3-way catalyst reaction, thereby sufficiently removing pollutants in the exhaust gases and improving the purification effect.

Further, the photocatalyst coated on the honeycomb carrier is activated by a photic source supplied from the wire mesh or the honeycomb electrodes to thereby perform the purification reaction. Since the wire mesh or the honeycomb electrodes are closely or distinctly disposed to both ends of the honeycomb carriers, respectively, a plasma photic source is established by a proper consumption of power, thereby improving energy efficiency.

In case of the honeycomb electrodes, the 3-way catalyst layer is formed on the honeycomb carrier as well as an electrode cell surface of the honeycomb electrodes to thereby purify pollutants in exhaust gases by heat produced in generating the plasma and to thereby improve the purification efficiency by continuously maintaining the purification reaction by the heat of the exhaust gases although the plasma is not generated.

Further, the honeycomb electrodes are prepared using an equipment or installation for preparing the honeycomb without using a separate equipment or installation because the honeycomb electrodes are in the same form as the honeycomb carrier, thereby reducing a manufacturing cost.

Furthermore, since the electrodes used are in the form of a honeycomb, the electrodes are not damaged easily by an external impact, thereby improving durability.

The purification system of the exhaust gases of the present invention is further provided with the oxygen supplying portion to thereby improve the exhausting purification effect and is useful to an environmental industry without being limited to the internal combustion engine.

Further, according to the present invention, the photocatalyst layer in which the photo catalyst is deposited is coated on a radiator of vehicles, a condenser of an air conditioner of the vehicles or a filter portion of a blower side in such a way that the photocatalyst is exited by an ultraviolet ray irradiated from the ultraviolet lamp to thereby purify pollutants contained in air passing through the radiator or the air introduced into an interior of the vehicles when the vehicles are moving. Accordingly, the present invention can purify the air during the travel of the vehicles irrespective of the settled purification capacity relative to the prior air purification system which is designed to adapt to an optional capacity in fixing in place as a fixing type and needs to a separate installation thereby reducing the installation cost. Further, the prior purification system needs a separate operating cost, while the inventive purification system can purify the air during the travel of the vehicles without requiring the separate operating cost.

It is of course that the present invention may be varied into an apparatus capable of removing a cigarette smoke, a smell of foodstuffs at a restaurant or a kitchen, a bad smell from a food fermenting device or a sewage treatment plant, or hydrocarbon floating in air by means of a combination of the above described photocatalyst reactor with fan.

While the invention has been shown and described with respect to the preferred embodiments, it will be understood by those skilled in the art that various changes and modifications may be made without departing from the spirit and scope of the invention as defined in the following claims.

What is claimed is:

1. A purification system of exhaust gases in an internal combustion engine for purifying the exhaust gases by disposing a reaction furnace capable of reducing noxious components of the exhaust gases in an exhaust pipe of the internal combustion engine, the system comprising:
   a reactor including a honeycomb carrier having a plurality of carrier cells, on each of which a photocatalyst layer is coated, in the reaction furnace; and
   a plasma generating means having a plurality of electrode cells and mounted at an inner end and an outer end of the honeycomb carrier;
   wherein the honeycomb carrier includes a 3-way catalyst layer coated on a wall surface of each of the carrier cells and the photocatalyst layer is coated on the 3-way catalyst layer, the photocatalyst layer being activated by a plasma photic source.

2. The purification system of claim 1, wherein a volume and a number of each of the electrode cells are varied depending upon the variation of that of each of the carrier cells, the carrier cells having 100–900 numbers per unit area (1 inch×1 inch).

3. The purification system of claim 1, wherein each of the electrode cells of the plasma generating means is electrodes including a wire mesh formed by intersecting and arranging wires.

4. The purification system of claim 3, wherein the electrode is closely or distantly disposed from the honeycomb carrier.

5. The purification system of claim 4, wherein a distance of each electrode from the honeycomb carrier is 1–40% of the length of the honeycomb carrier.

6. The purification system of claim 3, wherein edges of each of the electrode cells are arranged to be positioned at a center of each of the carrier cells.

7. The purification system of claim 1, wherein the plasma generating means is electrodes having a regular length in horizontal direction, a cross section of each of the electrodes being in the form of a honeycomb.

8. The purification system of claim 1, wherein the plasma generating means is electrodes including a wire mesh roll.

9. The purification system of claim 1, wherein the plasma generating means is electrodes including a punched plate.

10. The purification system of claim 1, further including a plurality of reactors in the reaction furnace.

11. The purification system of claim 10, wherein one electrode includes a wire mesh and is distinctly disposed between the reactors, while the other electrode includes a wire mesh or a punched plate and is closely disposed at the outer ends of the reactors.

12. The purification system of claim 10, wherein one electrode includes a wire mesh roll and is distinctly disposed between the reactors, while the other electrode includes a wire mesh or a punched plate and is closely disposed at the outer ends of the reactors.

13. A purification system of exhaust gases in an internal combustion engine for purifying the exhaust gases by disposing a reaction furnace capable of reducing noxious components of the exhaust gases in an exhaust pipe of the internal combustion engine, the system comprising:

a reactor including a honeycomb carrier having a plurality of carrier cells, on each of which a photocatalyst layer is coated, in the reaction furnace; and a plasma generating means having a plurality of electrode cells and mounted at an inner end and an outer end of the honeycomb carrier, wherein the plasma generating means is electrodes having a regular length in horizontal direction, a cross section of each of the electrodes being in the form of a honeycomb, wherein each cell of the electrode includes a 3-way catalyst layer coated on a surface thereof.

14. A purification system of exhaust gases in an internal combustion engine for purifying the exhaust gases by disposing a reaction furnace capable of reducing noxious components of the exhaust gases in an exhaust pipe of the internal combustion engine, the system comprising:

a reactor including a honeycomb carrier having a plurality of carrier cells, on each of which a photocatalyst layer is coated, in the reaction furnace, wherein the photocatalyst layer coated on the honeycomb induces plasma generation within the honeycomb carrier; and a plasma generating means having a plurality of electrode cells and mounted at an inner end and an outer end of the honeycomb carrier.

15. The purification system of claim 14, wherein the photocatalyst layer is activated by a plasma photic source.

16. The purification system of claim 14, wherein each of the electrode cells of the plasma generating means is electrodes including a wire mesh formed by intersecting and arranging wires.

17. The purification system of claim 14, wherein the plasma generating means is electrodes having a regular length in horizontal direction, a cross section of each of the electrodes being in the form of a honeycomb.

18. The purification system of claim 17, wherein the electrode is closely or distantly disposed from the honeycomb carrier.

19. The purification system of claim 18, wherein a distance of each electrode from the honeycomb carrier is 1–40% of the length of the honeycomb carrier.

20. The purification system of claim 17, wherein edges of each of the electrode cells are arranged to be positioned at a center of each of the carrier cells.

21. The purification system of claim 14, further including a plurality of reactors in the reaction furnace.

22. The purification system of claim 21, wherein one electrode includes a wire mesh and is distinctly disposed between the reactors, while the other electrode includes a wire mesh or a punched plate and is closely disposed at the outer ends of the reactors.

23. The purification system of claim 21, wherein one electrode includes a wire mesh roll and is distinctly disposed between the reactors, while the other electrode includes a wire mesh or a punched plate and is closely disposed at the outer ends of the reactors.

* * * * *